United States Patent Office

3,169,126
Patented Feb. 9, 1965

---

3,169,126
MONOAZO DYESTUFFS CONTAINING AN AMINO-SULFONYL DIALKYLAMINO RADICAL
Ernest Merian, Bottmingen, Basel-Land, Switzerland, Bruno J. R. Nicolaus, Milan, Italy, and Otto Senn, Arlesheim, Basel-Land, and Walter Wehrli, Riehen, Basel, Switzerland, assignors to Sandoz Ltd., Basel, Switzerland
No Drawing. Filed June 12, 1963, Ser. No. 287,222
Claims priority, application Switzerland, Aug. 13, 1959, 76,919/59
7 Claims. (Cl. 260—206)

This application is a continuation-in-part of application Serial No. 48,831, filed August 11, 1960, now abandoned.

This invention relates to new monoazo dyestuffs which are of low water-solubility and which correspond to the general formula

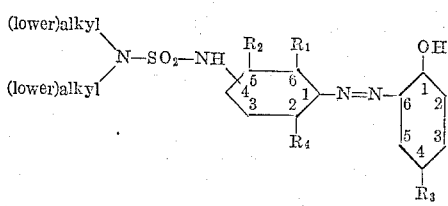

(I)

In this formula $R_1$ represents hydrogen, (lower)alkyl, (e.g. methyl, propyl, butyl), fluorine, chlorine or bromine, $R_2$ represents hydrogen, (lower)alkyl (e.g. methyl, propyl, butyl), (lower)alkoxy (e.g. methoxy, butoxy), chlorine or bromine, $R_3$ represents alkyl of 1 to 5 carbons, (lower)alkoxy (e.g. methoxy, butoxy), (lower)acylamino (e.g. acetylamino, propionylamino), chlorine, bromine or fluorine, and $R_4$ represents hydrogen, (lower)alkyl (e.g. methyl, propyl, butyl), chlorine or bromine. Preferably at least one of the symbols $R_1$, $R_2$ and $R_4$ represents hydrogen.

"(Lower)alkyl" means alkyl containing 1 to 4, or particularly 1 to 2 carbon atoms. Preferably the radical

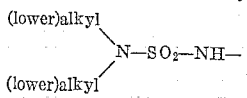

is connected to the nucleus in the position 3 or 4.

The process for the production of the new dyestuffs consists in coupling a diazotized amine of the general formula

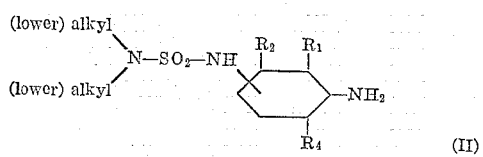

(II)

with a hydroxy benzene of the general formula

(III)

preferably at pH values above 7, especially at 7–12, in the manner described in the examples.

The new monoazo dyestuffs of low water-solubility dye from aqueous dispersion synthetic polyamide fibers such as nylon and Perlon (registered trademark); cellulose ester fibers, e.g. secondary cellulose acetate and triacetate; polyvinyl fibers; acrylic and modified acrylic fibers, especially polyacrylonitrile fibers, polyester fibers, preferably terephthalic acid ester fibers such as Terylene, Dacron, Dacron 64, Kodel and Vycron (registered trademarks) in yellow or orange shades. The dyestuffs can also be applied to the same fibers by padding or printing techniques. They have good building-up properties on these fibers. The dyeings and prints possess very good fastness to light, gas fumes, washing, heat setting, pleating, sublimation, perspiration, water and sea water, and are dischargeable. A fairly good reserve of viscose rayon, cotton, and wool is obtained, especially on aftertreatment with a hydrosulfite. The new dyestuffs are also suitable for coloring lacquers, oils, plastics and artifical fibers in the mass. Cellulose acetate and triacetate dyed in the dope with these dyestuffs have high fastness to light, washing, perspiration, gas fumes, cross dyeing, alkaline bleaching, oxalic acid, dry cleaning and peroxide bleaching, and excellent fastness to water, sea water, soap baths, crocking, decatizing and pressing.

In the following examples the parts and percentages are by weight and the temperatures in degrees centigrade.

EXAMPLE 1

21.5 parts of 1-amino-4-dimethylaminosulfonylaminobenzene are dissolved cold in a mixture of 100 parts of water and 36 parts of 30% hydrochloric acid and diazotized with a solution of 7 parts of sodium nitrite and 20 parts of water at 0°. The clear diazo solution obtained is added dropwise with vigorous stirring to a solution of 11 parts of 1-hydroxy-4-methyl-benzene, 14 parts of 30% sodium hydroxide solution, 30 parts of sodium carbonate and 200 parts of water at about 5°. After a short time coupling is completed and the brown-yellow precipitate is filtered off, washed neutral with water and dried with vacuum at about 70°. The crude product so formed is obtained in almost quantitative yield and is sufficiently pure for coloristic purposes. It can easily be obtained in an analytically pure state, however, by re-crystallization from ethyl alcohol. It then melts at 170°, dissolves in concentrated sulfuric acid and in organic solvents with a yellow coloration and possesses in dimethylformamide solution an absorption maximum at 400 m$\mu$, a specific extension coefficient $\epsilon^*$ of 47.4 and a molar extinction coefficient $\epsilon$ of $15.8 \times 10^3$.

The new dyestuff dyes from aqueous dispersion acetate, triacetate, synthetic polyamide fibers and polyester fibers in yellow shades of high tinctorial strength and excellent fastness to light, washing, perspiration, sea water, gas fumes, sublimation, pleating and cross-dyeing. The dyeings are dischargeable. The dyestuff gives a good reserve of cotton viscose and wool, and the reserve can be improved by a suitable aftertreatment, e.g. with hydrosulfite. The outstanding washing fastness of this dyestuff on synthetic polyamide fibers is especially notable.

Synthetic polyamide fibers are dyed as follows: 4 parts of the new dyestuff and 6 parts of sulfite cellulose waste powder are ground together. 1 part of the preparation obtained is pasted with a little water and made up to 2000 parts with 2 parts of a fatty alcohol sulfonate and the necessary amount of water. 100 parts of nylon are entered and the dyebath heated to 100° and boiled for 1 hour. The dyed nylon is then removed, rinsed and dried.

Polyester fibers are dyed as follows: 7 parts of the new dyestuff and 4 parts of sodium dinaphthylmethanedisulfonate, 4 parts of sodium cetyl sulfate and 5 parts of anhydrous sodium sulfate are ground in a ball mill for 48 hours to give a fine powder. 1 part of the resulting dyeing preparation is dispersed in a little water and the dispersion added through a sieve to a dyebath containing 2 parts of sodium lauryl sulfate in 4000 parts of water. 100 parts of a scoured fabric of Dacron (registered trademark) polyester fiber are entered at 40–50°, the bath heated slowly and dyeing continued for 1–2 hours at 95–100° in presence of 20 parts of an emulsion of a chlorinated benzene in water. The yellow dyeing obtained is then rinsed, soaped, rinsed again and dried. It is fast to light, cross-dyeing, washing, water, sea water, perspiration, gas fumes, sublimation, heat setting and pleating, and is white dischargeable.

The same procedure can be used to dye 100 parts of Arnel (registered trademark) triacetate fiber in a yellow shade with similar fastness properties, no addition of carrier being necessary.

The diazo component used in this example is new and is produced as follows:

13.8 parts of 4-nitro-1-aminobenzene are dissolved in 25 parts of pyridine and at 10°, 15.7 parts of dimethylaminosulfonic acid chloride are added dropwise. The reaction mass is stirred for 10 hours at room temperature and then added with vigorous stirring to a mixture of 40 parts of technical 30% hydrochloric acid and 80 parts of ice. The precipitated product is filtered off and washed neutral. In the crude state it melts at 127–138° and on re-crystallization from ethyl alcohol at 146°.

The product which is obtained in practically quantitative yield has the constitution:

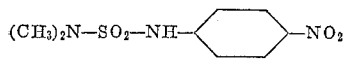

the crude nitro compound obtained is dissolved in 100 parts of ethyl alcohol and reduced in presence of 2 parts of Raney nickel catalyst at 50° with 7.5 liters of hydrogen (theoretical uptake 7.4 liters).

After separation of the catalyst the solution is carefully evaporated in vacuum and then cooled to 0°. The precipitated amino compound is filtered off and dried. It is analytically pure and melts at 122–123°. The reduction proceeds quantitatively and gives the new amino compound in excellent yield and purity.

EXAMPLE 2

21.5 parts of 1-amino-3-dimethylaminosulfonylaminobenzene are diazotized as described in Example 1 and are coupled with 11 parts of 1-hydroxy-4-methyl-benzene. The dyestuff obtained has good properties especially on polyester.

EXAMPLE 3

21.5 parts of 1-amino-3-dimethylaminosulfonylaminobenzene are diazotized as described in Example 1 and are coupled with 15 parts of 1-hydroxy-4-chloro-benzene.

EXAMPLE 4

24.9 parts of 1-amino-3-dimethylaminosulfonylamino-2-chloro-benzene are diazotized as described in Example 1 and are coupled with 11 parts of 1-hydroxy-4-methyl-benzene. The fastness properties of dyeings obtained with this dyestuff on fiber materials of synthetic polyamide (nylon) and secondary cellulose acetate are especially good.

In the following table further monoazo dyestuffs are recited which can be produced in a manner analogous to that described in Example 1 and which are suitable for dyeing synthetic polyamide and other artificial fibers.

Table

| Example No. | (Lower) alkyl | Position of (lower)alkyl $\diagdown$ N—SO$_2$—NH— (lower)alkyl $\diagup$ | $R_1$ | $R_2$ | $R_4$ | $R_3$ | Shade of dyeing on artificial fibers |
|---|---|---|---|---|---|---|---|
| 5 | CH$_3$ | 3 | H | H | H | Cl | Yellow. |
| 6 | CH$_3$ | 4 | H | H | H | Br | Do. |
| 7 | CH$_3$ | 4 | H | H | H | C$_2$H$_5$ | Do. |
| 8 | CH$_3$ | 3 | H | H | H | C$_4$H$_9$ | Do. |
| 9 | CH$_3$ | 4 | H | H | H | C$_5$H$_{11}$ | Do. |
| 10 | CH$_3$ | 4 | H | H | H | OCH$_3$ | Do. |
| 11 | CH$_3$ | 4 | H | H | H | OC$_2$H$_5$ | Do. |
| 12 | C$_2$H$_5$ | 4 | H | H | H | CH$_3$ | Do. |
| 13 | C$_4$H$_9$ | 4 | H | H | H | CH$_3$ | Do. |
| 14 | C$_3$H$_7$ | 4 | H | H | H | CH$_3$ | Do. |
| 15 | CH$_3$ | 4 | Cl | H | H | CH$_3$ | Do. |
| 16 | CH$_3$ | 4 | CH$_3$ | H | H | CH$_3$ | Do. |
| 17 | CH$_3$ | 4 | CH$_3$ | CH$_3$ | H | CH$_3$ | Do. |
| 18 | CH$_3$ | 4 | H | OCH$_3$ | H | CH$_3$ | Do. |
| 19 | CH$_3$ | 4 | H | Cl | Cl | CH$_3$ | Do. |
| 20 | CH$_3$ | 4 | Cl | H | Cl | CH$_3$ | Do. |
| 21 | CH$_3$ | 4 | H | Br | H | CH$_3$ | Do. |
| 22 | CH$_3$ | 4 | F | H | H | CH$_3$ | Do. |
| 23 | CH$_3$ | 4 | H | C$_2$H$_5$ | H | CH$_3$ | Do. |
| 24 | CH$_3$ | 4 | C$_2$H$_5$ | H | H | CH$_3$ | Do. |
| 25 | CH$_3$ | 4 | H | Cl | H | CH$_3$ | Do. |
| 26 | CH$_3$ | 4 | Br | H | H | CH$_3$ | Do. |
| 27 | CH$_3$ | 4 | H | F | H | CH$_3$ | Do. |
| 28 | CH$_3$ | 4 | H | H | H | iso-C$_3$H$_7$ | Do. |
| 29 | C$_2$H$_5$ | 3 | H | H | H | CH$_3$ | Do. |
| 30 | C$_2$H$_5$ | 3 | H | H | H | Cl | Do. |
| 31 | CH$_3$ | 3 | H | H | H | CH$_3$-CO-NH | Do. |
| 32 | CH$_3$ | 3 | Cl | H | H | CH$_3$ | Do. |
| 33 | CH$_3$ | 3 | CH$_3$ | H | H | CH$_3$ | Do. |
| 34 | CH$_3$ | 3 | Br | H | H | CH$_3$ | Do. |
| 35 | CH$_3$ | 3 | Cl | H | Cl | CH$_3$ | Do. |
| 36 | CH$_3$ | 3 | H | H | H | F | Do. |
| 37 | CH$_3$ | 4 | H | H | H | F | Do. |
| 38 | CH$_3$ | 3 | Cl | H | H | NH-COCH$_3$ | Do. |
| 39 | CH$_3$ | 3 | Cl | H | H | NH-CO-C$_2$H$_5$ | Do. |
| 40 | CH$_3$ | 3 | Cl | H | H | F | Do. |
| 41 | CH$_3$ | 3 | Cl | H | H | Br | Do. |
| 42 | CH$_3$ | 3 | Cl | H | H | O-CH$_3$ | Do. |
| 43 | CH$_3$ | 4 | H | Cl | Cl | O-CH$_3$ | Do. |
| 44 | CH$_3$ | 4 | H | Cl | Cl | NH-CO-CH$_3$ | Do. |
| 45 | CH$_3$ | 4 | Cl | H | Cl | -OCH$_3$ | Do. |
| 46 | CH$_3$ | 4 | Cl | H | Cl | C$_2$H$_5$ | Do. |
| 47 | CH$_3$ | 4 | Br | H | Br | CH$_3$ | Do. |
| 48 | CH$_3$ | 4 | Br | H | Br | C$_2$H$_5$ | Do. |
| 49 | CH$_3$ | 4 | Br | H | Br | OCH$_3$ | Do. |
| 50 | CH$_3$ | 3 | CH$_3$ | H | H | Br | Do. |
| 51 | CH$_3$ | 3 | CH$_3$ | H | H | F | Do. |
| 52 | CH$_3$ | 3 | CH$_3$ | H | H | OCH$_3$ | Do. |
| 53 | CH$_3$ | 3 | CH$_3$ | H | H | NH-CO-CH$_3$ | Do. |

What we claim is:
1. Monoazo dyestuff of the formula

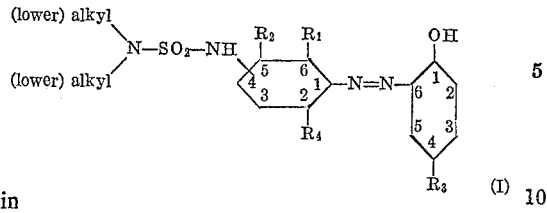

wherein
R₁ is a member selected from the group consisting of hydrogen, (lower)alkyl, fluorine, chlorine and bromine,
R₂ is a member selected from the group consisting of hydrogen, (lower)alkyl, (lower)alkoxy, chlorine and bromine,
R₃ is a member selected from the group consisting of alkyl of 1 to 5 carbons, (lower)alkoxy, (lower)acylamino, chlorine, bromine and fluorine, and
R₄ is a member selected from the group consisting of hydrogen, (lower)alkyl, chlorine and bromine.

2. The monoazo dyestuff of the formula

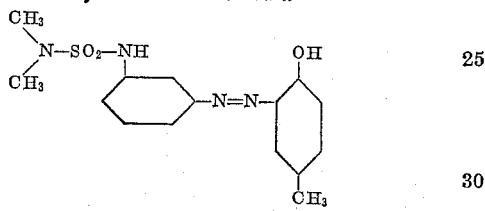

3. The monoazo dyestuff of the formula

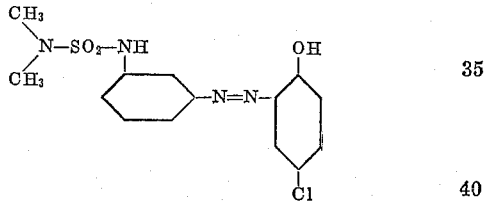

4. The monoazo dyestuff of the formula

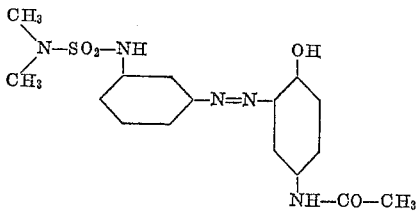

5. The monoazo dyestuff of the formula

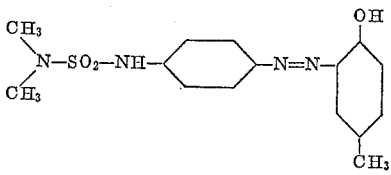

6. The monoazo dyestuff of the formula

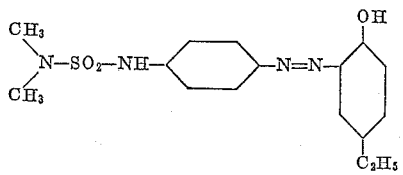

7. The monoazo dyestuff of the formula

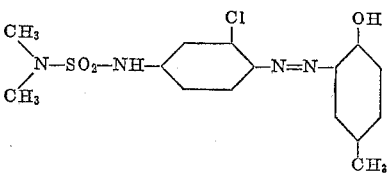

References Cited in the file of this patent
UNITED STATES PATENTS
2,909,515    Ruckstuhl et al. _____ Oct. 20, 1959